May 4, 1965  J. L. ARMENTROUT  3,181,699
PACKAGING METHOD AND PRODUCT
Filed Sept. 21, 1961  2 Sheets-Sheet 1
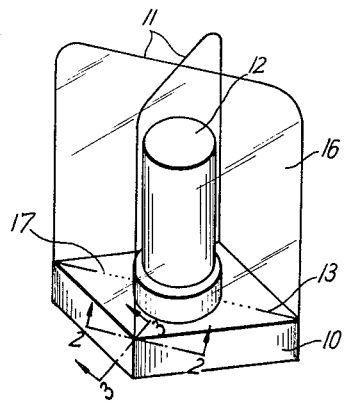
FIG_1_
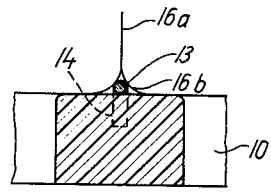
FIG_2_
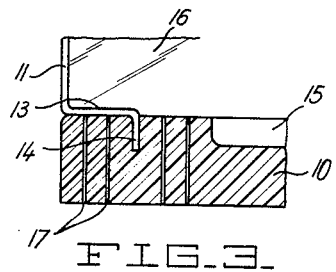
FIG_3_
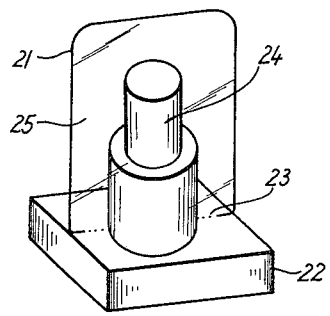
FIG_4_
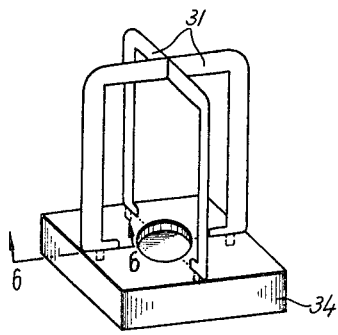
FIG_5_
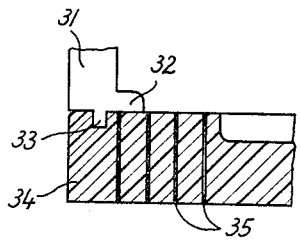
FIG_6_
INVENTOR.
James L. Armentrout
BY
*Flehr and Swain*
ATTORNEYS

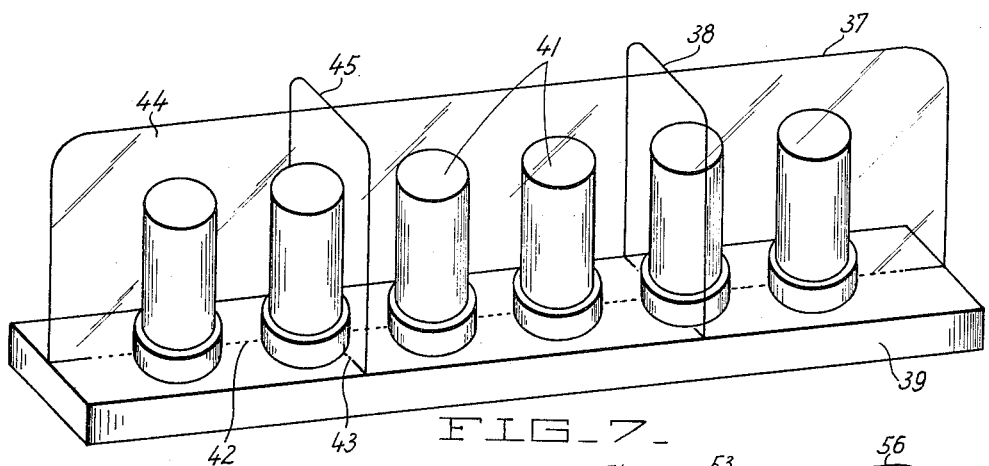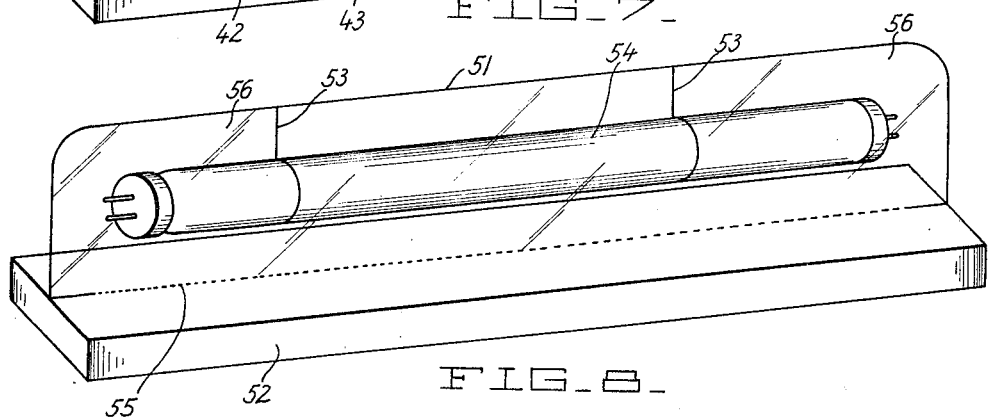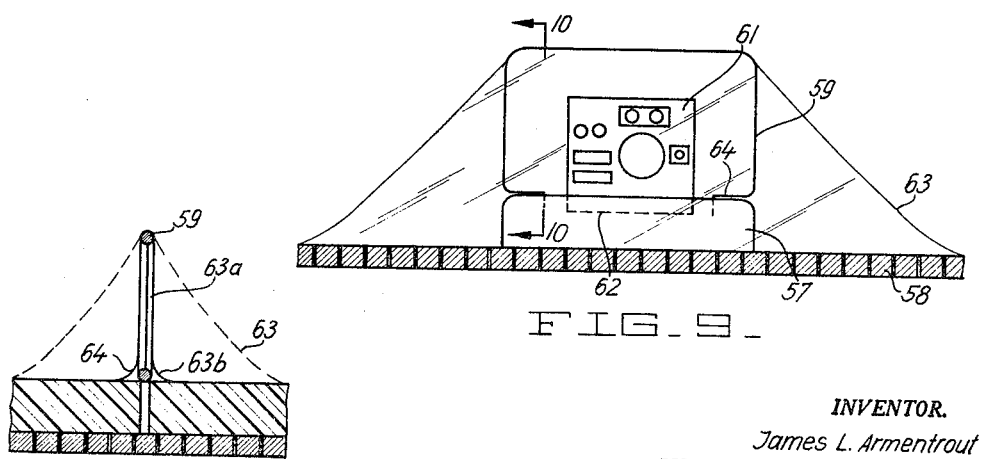

United States Patent Office 3,181,699
Patented May 4, 1965

3,181,699
PACKAGING METHOD AND PRODUCT
James L. Armentrout, San Francisco, Calif., assignor to Avery Industries, Incorporated, San Mateo, Calif., a corporation of California
Filed Sept. 21, 1961, Ser. No. 139,695
9 Claims. (Cl. 206—80)

This invention relates generally to plastic film or skin packaging methods and products, and to apparatus or devices used therein.

So-called film or skin packaging employs a film of thermoplastic plastic material which is applied to envelop and retain an object on a base pad or board. In a typical example the machine employed has a perforated table or platen on which the pad is placed, with the object to be wrapped resting on the pad. The pad may be made of corrugated fiberboard, with its upper surface perforated and provided with a plastic surfacing. A sheet or web of material like polyethylene is clamped in a frame above the platen and exposed to infra red heat to make it thermoplastic. Then the sheet in thermoplastic condition is lowered upon the object, and suction is applied through the perforated platen, whereby the sheet is drawn down about the object and bonded to the pad in regions generally surrounding the object. When the object has a substantial vertical height, or has one or more parts of substantial height, the plastic sheet tends to form folds or webs, instead of providing a smooth enveloping skin. This webbing effect is uncontrolled, and it does not conform to a consistent pattern in successive wrapping operations. If it is attempted to minimize or eliminate the webbing effect by increased stretching of the film then the film tends to be weakened in localized regions by excessive attenuation. The presence of folds of webs in the final package is deemed objectionable, particularly because they make the package unattractive, and may make it difficult if not impossible to separate a plurality of connected packages formed simultaneously.

In general, it is an object of the present invention to provide a novel film or skin packaging method which will provide controlled webbing of such a character as to perform advantageous functions in the finished package.

Another object of the invention is to provide a method of the above character in which webbing formed in the finished package serves to suspend, control and/or retain objects in a desired position.

Another object of the invention is to provide assemblies or devices for use in the foregoing method, and which incorporate means for insuring and controlling the formation of desired webs.

Another object of the invention is to provide novel packages made by the foregoing method, and which are characterized by the presence of webs that form a part of the package structure.

Another object of the invention is to provide a novel package resulting from my method, which contains means whereby the packaged object or objects are better protected against mechanical injury.

Another object of the invention is to provide a novel package wherein the packaged object or objects are held in a predetermined manner by plastic webbing.

Additional objects and features of the invention will appear from the following description in which the preferred embodiments have been set forth in detail in conjunction with the accompanying drawing.

Referring to the drawing:

FIGURE 1 is a perspective view illustrating one package made in accordance with the present invention;

FIGURE 2 is a cross sectional detail on an enlarged scale taken along the line 2—2 of FIGURE 1;

FIGURE 3 is an enlarged detail in section taken along the line 3—3 of FIGURE 1;

FIGURE 4 is a perspective view like FIGURE 1, but showing another embodiment;

FIGURE 5 is a perspective view like FIGURE 1, but showing another embodiment;

FIGURE 6 is a detail in section on an enlarged scale, taken along the line 6—6 of FIGURE 5;

FIGURE 7 is a perspective view illustrating another embodiment in which a plurality of objects are included in a single package;

FIGURE 8 is a perspective view like FIGURE 7, showing a package in which an object is completely suspended by webbing;

FIGURE 9 is a side-elevational view, partly in cross section, illustrating the manner in which my method is applied; and FIGURE 10 is a detail taken along the line 10—10 of FIGURE 9.

In accordance with the present invention, I make use of a pad or board together with means which function to form predetermined webs in the final package. This means includes one or more strut elements carried by the base pad, and in addition, may include perforate regions localized in such a manner as to aid in controlling the location of the webs.

Referring to the complete package shown in FIGURES 1–3, it consists of a base pad 10, together with the strut elements 11. In this instance the elements 11 are in the form of metal wires that are bent U-shaped and which extend alongside and bridge over the object 12 being packaged. The foot portions of the elements 11 include in this instance the laterally bent portions 13 which extend along the upper face of the pad 10, and the downwardly bent portions 14 which project into apertures formed in the pad.

The material from which the pad 10 is made may vary in different instances. For example, it may be formed of cellulose fiber, or from aerated or cellular plastic materials, such as styrene foam. The central region of the pad may be provided with a cavity 14, to accommodate the base portion of the object 12.

As previously stated, it is desirable to provide perforate regions to aid in controlling the positioning of webs. Thus, the base is provided with rows of perforations 17, which extend generally in the planes of the elements 11. It will be noted that in this instance the planes of the elements 11 intersect in the space to be occupied by the object 12, and they are substantially at right angles to each other and perpendicular to the general plane of the base.

To carry out a packaging operation, by use of the assembly shown in FIGURES 1–3, a sheet of plastic material, such as polyethylene, in thermoplastic condition, is lowered upon the struts 11, with the pad 10 resting upon the perforated platen of a film packaging machine. With application of suction to the lower side of the platen, the thermoplastic sheet is drawn inwardly toward the object 12, and in its engagement with the strut elements 11, it is folded about these elements to form the webs 16a. In other words, wall portions of the thermoplastic film are folded about the strut elements 11, and then brought into contact with each other, whereby they adhere together to form webs extending inwardly toward the object 12. Other wall portions of the film are drawn inwardly about and in contact with the object 12, thereby forming a retaining envelope that is connected to the strut elements 11 by the webs 16. The region of intersection of each web and the upper face of the base pad 10 is controlled in part by the location of the perforations 17. Thus the localized positioning of perforations 17 tends to maintain the formation of the webs 16 in the planes of the strut elements 11, whereby when the lower portions of the webs nearest the pad 10 are last formed, they are substantially aligned with the perforations.

In addition to forming a retaining envelope about the object 12 and the webs, the film while thermoplastic is brought into intimate contact with the upper surfaces of the pad 10 surrounding the object, and also with the outer peripheral surfaces of the pad. Assuming that the pad has a proper surfacing, its upper and peripheral surfaces adhere to the thermoplastic film, whereby the pad becomes a part of the package.

As shown in FIGURE 2, in the complete package the portions 16b of the film extend from the webs 16a to the adjacent upper surface of the pad 10. This effectively serves to retain the portions 13 anchored to the pad while at the same time the portions 13 provide adequate bearing upon the pad, to resist downwardly applied forces.

The package described above and shown in FIGURE 1, has many desirable features. The webs 16 are controlled with respect to their location, and they form structural members which aid in retaining the object 12 in the desired location. The strut elements 11 not only play a part in forming the desired webs, but in addition, they provide protection for the object. In other words, they tend to resist crushing forces applied laterally to or from the top of the package.

It will be evident that my package is capable of many different embodiments, depending upon the type and shape of the object, the kind of retention desired for particular items and upon the extent of physical protection required.

In FIGURE 4, the package shown in FIGURE 1 has been simplified by employing only one strut element 21 which is similar to one of the elements 11 in FIGURE 1. The pad 22 is substantially the same as in FIGURE 1, except that a single row of perforations 23 is provided. The object 24 in this instance is enclosed within a plastic envelope formed by the thermoplastic film, and this envelope is attached to the strut element 21, by the plastic web 25.

FIGURES 5 and 6 show modified base and strut means for a package similar to FIGURE 1. In this instance the strut elements 31 are made flat, and of material like fiberboard, plastic impregnated sheet fiber, molded plastic, or the like. The foot portions of the strut elements have lateral extensions 32 which perform the same function as the portions 13 of the struts 11 in FIGURE 1. Also they have tabs 33 which can project in apertures formed in the base 34. Here again the base is provided with perforations 35, located in the planes of the elements 31.

FIGURE 7 shows a package for a plurality of objects. Thus, in this case the strut elements 37 and 38 are carried by the base pad 39 and they are disposed in planes at right angles to each other, and perpendicular to the general plane of the base. The objects 41 are spaced along the length of the strut element 37 and the base is provided with perforations 42 and 43, disposed generally in the planes of the strut elements. Upon application of a thermoplastic film to the assembly of FIGURE 7, each of the objects 41 is enclosed within its individual plastic film envelope, and all of these individual envelopes are connected to the strut element 37, by the longitudinal web 44. In addition, lateral webs 45 are formed, which strengthen the web 44 and strut element 37 against lateral displacement, and which, together with the transverse strut elements 38, afford greater protection against injury to the objects.

In the foregoing described embodiments, the objects being packaged are disposed upon the base pad. In the embodiment of FIGURE 8, the packaged object is supported entirely by webbing. Thus, in this instance a strut element 51 is supported by the base pad 52. Threads, wires or cords 53 are shown for suspending the tube 54 or other object above the pad 52, preparatory to a packaging operation. The pad is provided with a row of perforations 55 located in the plane of the strut element 51. When the assembly of FIGURE 8 is packaged in the manner previously described, the thermoplastic film folds over the strut element 51 and forms a plastic web 56 which extends in the plane of the strut element, and which forms a mechanical connection between the strut element and the envelope which encloses the object 54. After the packaging operation, the cords 53 no longer suspend the object, but the object is completely enclosed by the plastic film and is suspended by the web. With such a package the object is cushioned against shock, and at the same time it is protected against damage.

FIGURE 9 shows a simple assembly similar to FIGURE 4. In this instance the base pad 57 is shown resting upon the perforated platen 58 of a film packaging machine. A strut element 59 is carried by the base pad, and is somewhat similar to the strut element 21 of FIGURE 4. The object 61 being packaged in this instance is a mounting card carrying a plurality of electrical components. Its lower edge may be set within a recess 62, formed in the pad 57. The thermoplastic film 63 is shown being drawn down over this assembly, in the manner previously described.

FIGURE 10 illustrates a film portion 63a which forms a web extending from the strut 59 to the mounting card 61. Portions 63b of the film engage over the foot portions 64 of the strut elements 59, and serve as a means to hold the foot portions against the pad. The dotted line shown in FIGURE 10 represents an intermediate position of the thermoplastic film, as it is folding about the strut element 59 to form the web 63a, and form an envelope about the object 61.

In view of the foregoing it is evident that I have provided a novel film packaging method capable of producing a variety of packages having novel characteristics. In addition, I have provided assemblies which can be sold to the trade, and which can be applied by the trade in film packaging operations.

I claim:

1. In a package wherein an object is enclosed at least in part in a plastic skin, a base pad, web supporting strut means carried by the pad and extending from one face of the same, and a plastic film having wall portions forming an envelope which envelops and retains the object, and also having wall portions folded about the strut means and bonded together to form web portions extending outwardly from the envelope to the strut means, said film also having wall portions that are bonded to the base.

2. A package as in claim 1 in which the strut means comprises a plurality of elements extending in a plurality of directions.

3. A package as in claim 1, in which the strut means and the web means engaged by the strut means extend in a plurality of planes which extend outwardly from the base pad and which intersect within the space enclosed by the envelope.

4. A package as in claim 1, in which the strut means is provided with foot portions engaging the base pad, said foot portions including portions extending along the face of the pad and held against said pad by said film.

5. A package as in claim 1 in which the region of intersection of each web with the said face of the pad is characterized by perforations extending through the pad, for application of suction.

6. In a skin packaging method, wherein a film in thermoplastic condition is caused to embrace an object to be packaged together with a base pad underlying the object, the steps of providing strut means extending from the base pad and generally embracing more than one side of the object, lowering a plastic film in thermoplastic condition upon the strut means, applying a partial vacuum to the region underlying the pad whereby the thermoplastic film is caused to be drawn inwardly toward the object to form wall portions engaging the object and also causing wall portions to be folded about the strut means and to adhere together in the form of webs extending outwardly from the envelope to the strut means, and causing other portions of film to contact and bond to the base pad.

7. A method as in claim 6 in which the location of the webs is controlled by withdrawing air from localized regions of the base pad which are located substantially on the lines of intersection of the desired webs and the corresponding face of the pad.

8. Apparatus of the character described for use in skin packaging, wherein an object on the pad is enclosed in an envelope formed by a skin of thermoplastic material that is drawn closely about the object and in which folded portions of the skin are caused to form at least one web extending from the envelope, a base pad having an area on one face of the same to accommodate an object to be packaged, and film engaging strut means carried by the pad and extending from said one face, said strut means including at least two foot portions located at spaced regions on said one face of the pad and portions that connect the foot portions and which extend in spaced relationship with the pad and an object placed on said area, said pad being provided with regions pervious to passage of air therethrough that extend from said foot portions to said area and serve to control formation of plastic webs extending from the strut means to the object being wrapped, when a plastic film is drawn about the object and is folded about said strut means, the remaining areas of the base pad located between the foot portions being relatively impervious.

9. Apparatus as in claim 8 in which the strut means includes more than one strut element, the elements extending in intersecting planes.

References Cited by the Examiner
UNITED STATES PATENTS

| | | | |
|---|---|---|---|
| 2,106,425 | 1/38 | Grant | 206—45.33 |
| 2,163,138 | 6/39 | Baldwin | 206—45.33 |
| 2,315,001 | 3/43 | Logan | 206—45.33 |
| 2,879,886 | 3/59 | Crane | 206—45.33 |
| 2,984,056 | 5/61 | Scholl | 206—80 |
| 2,994,425 | 8/61 | Honeycutt | 206—46 |
| 3,031,072 | 4/62 | Kraut | 206—80 |

FOREIGN PATENTS 784,503  10/57  Great Britain.

THERON E. CONDON, *Primary Examiner.*

FRANKLIN T. GARRETT, *Examiner.*